(12) United States Patent
Jeon et al.

(10) Patent No.: US 10,769,906 B2
(45) Date of Patent: Sep. 8, 2020

(54) DOORBELL, SECURITY SYSTEM INCLUDING DOORBELL APPARATUS, AND METHOD OF OPERATING THE SAME

(71) Applicant: Hanwha Techwin Co., Ltd., Seongnam-si (KR)

(72) Inventors: KiYong Jeon, Seongnam-si (KR); Takwon Cho, Seongnam-si (KR); SeokYong Yoon, Seongnam-si (KR)

(73) Assignee: Hanwha Techwin Co., Ltd., Seongnam-si (KR)

( * ) Notice: Subject to any disclaimer, the term of this patent is extended or adjusted under 35 U.S.C. 154(b) by 0 days.

(21) Appl. No.: 16/105,995

(22) Filed: Aug. 21, 2018

(65) Prior Publication Data

US 2019/0066471 A1   Feb. 28, 2019

Related U.S. Application Data

(60) Provisional application No. 62/649,684, filed on Mar. 29, 2018.

(30) Foreign Application Priority Data

Aug. 31, 2017  (KR) .................. 10-2017-0111050

(51) Int. Cl.
| | | |
|---|---|---|
| *G08B 13/196* | (2006.01) | |
| *G08B 1/08* | (2006.01) | |
| *G06K 9/00* | (2006.01) | |

(52) U.S. Cl.
CPC ......... *G08B 13/19608* (2013.01); *G08B 1/08* (2013.01); *G08B 13/19613* (2013.01); *G08B 13/19656* (2013.01); *G06K 9/00288* (2013.01); *G08B 13/19684* (2013.01)

(58) Field of Classification Search
None
See application file for complete search history.

(56) References Cited

U.S. PATENT DOCUMENTS

| | | | |
|---|---|---|---|
| 9,055,202 | B1 | 6/2015 | Scalisi et al. |
| 9,179,107 | B1 | 11/2015 | Scalisi et al. |
| 9,179,109 | B1 | 11/2015 | Kasmir et al. |
| 9,524,437 | B2 | 12/2016 | Scanlon et al. |

(Continued)

FOREIGN PATENT DOCUMENTS

| | | |
|---|---|---|
| KR | 10-1523811 | 5/2015 |
| KR | 10-1729906 | 5/2017 |
| KR | 10-1743689 | 6/2017 |

*Primary Examiner* — Fernando Alcon
(74) *Attorney, Agent, or Firm* — H.C. Park & Associates, PLC

(57) ABSTRACT

A doorbell apparatus includes a camera to acquire a first image of an object in a first region and a second image of the object in a second region disposed closer to the camera than the first region; an image processing unit to detect the object in the first image and to identify the object in the second image, the image processing unit having a first image processing unit that detects and saves the first images and a second image processing unit that identifies and saves objects in the second images; a storage device to store the second image corresponding to the identified object; and an alarming unit to activate an alarm signal depending on whether the identified object corresponds to a predetermined object.

19 Claims, 10 Drawing Sheets

(56) References Cited

U.S. PATENT DOCUMENTS

| | | | | |
|---|---|---|---|---|
| 2005/0104958 | A1* | 5/2005 | Egnal | G01S 3/7864 |
| | | | | 348/143 |
| 2007/0233816 | A1* | 10/2007 | Odenwald | G06F 16/639 |
| | | | | 709/219 |
| 2016/0358433 | A1* | 12/2016 | Johnson | G06K 9/00255 |
| 2018/0232592 | A1* | 8/2018 | Stewart | G08B 13/19606 |
| 2018/0261060 | A1* | 9/2018 | Siminoff | G08B 13/19613 |
| 2018/0330169 | A1* | 11/2018 | van Hoof | G06K 9/00771 |
| 2018/0349708 | A1* | 12/2018 | van Hoof | G06K 9/00771 |

\* cited by examiner

DOORBELL, SECURITY SYSTEM INCLUDING DOORBELL APPARATUS, AND METHOD OF OPERATING THE SAME

CROSS REFERENCE TO RELATED APPLICATIONS

This application claims priorities from and the benefit of Korean Patent Application No. 10-2017-0111050, filed on Aug. 31, 2017, and the U.S. Provisional Patent Application No. 62/649,684, filed on Mar. 29, 2018, which are hereby incorporated by reference for all purposes as if fully set forth herein.

BACKGROUND

Field

Exemplary implementations of the invention relate generally to a doorbell apparatus, and more particularly, to a security system including a doorbell and method of operating the same which is capable of reducing detection errors when an object is captured by a camera of the doorbell apparatus.

Discussion of the Background

Generally, in doorbell devices, a camera can be installed so that when the visitor presses the bell, the owner of the premises or other user can visually confirm the environment near the door including the identity of the visitor using biometric or other image recognition technology.

In recent years, a captured image of a camera in a doorbell device can be transmitted as a push message to a user terminal (e.g., a mobile phone), and the user can receive such a push message, so that the user can communicate with the visitor by the user terminal.

However, in the conventional art, since the camera of the doorbell uses a motion detection technique to generate a signal to capture an image, objects to be imaged may detected and imaged erroneously, such as when a change in illuminance is detected as motion of an object. In these instances, when a user receives a push message and connects to a video call, a blank image is displayed instead of a visitor.

The above information disclosed in this Background section is only for understanding of the background of the inventive concepts, and, therefore, it may contain information that does not constitute prior art.

SUMMARY

Doorbells and security systems including a doorbell apparatus constructed according to the principles and exemplary implementations of the invention are capable of reducing errors in detecting and imaging objects. For example, the object may be initially detected at a far distance, but not imaged and identifying until it is detected at a closer distance. In this manner, devices constructed according to the principles and exemplary implementations of the invention can reduce erroneous detection of an object captured by a camera of the doorbell apparatus and provide the user with accurate information about the captured object.

Additional features of the inventive concepts will be set forth in the description which follows, and in part will be apparent from the description, or may be learned by practice of the inventive concepts.

According to one aspect of the invention, a doorbell apparatus includes a camera to acquire a first image of an object in a first region and a second image of the object in a second region disposed closer to the camera than the first region; an image processing unit to detect the object in the first image and to identify the object in the second image, the image processing unit having a first image processing unit that detects and saves the first images and a second image processing unit that identifies and saves objects in the second images; a storage device to store the second image corresponding to the identified object; and an alarming unit to activate an alarm signal depending on whether the identified object corresponds to a predetermined object.

The doorbell apparatus may further include a motion detector to determine whether an object is in the first region or the second region.

The motion detector may send a first signal to the camera to capture the first image if the object is in the first region, and the motion detector may send a second signal to the camera to capture the second image if the object is in the second region.

The motion detector may send a first signal to the first image processing unit to detect the object in the first image if the object is in the first region, and the motion detector may send a second signal to the second image processing unit to identify the object in the second image if the object is in the second region.

The image processing unit may be configured to identify all objects in the second images.

The first image processing unit may separately detect and/or identify objects by applying different image processing algorithms.

The image processing unit may be configured to divide the image acquired by the camera into first and second areas, and apply different algorithm to image data in the first and second areas.

The first image processing unit may apply an object detection algorithm to the first area corresponding to the first region, and the second image processing unit may apply an object identification algorithm to the second area corresponding to the second region.

The second area may be a center portion of the image acquired by the camera.

The doorbell apparatus may further include a microphone installed on the outside of the door, a sound processing unit to detect a sound event received from the microphone and to store the image captured by the camera in the storage device when the sound event is detected.

According to another aspect of the invention, a security system includes a doorbell to detect an object in a first region, and to identify the object in a second region; a user terminal to receive information corresponding the identified object from the doorbell; and a communication network to provide one or more communication channels between the user terminal and the doorbell. The doorbell includes a camera to acquire a first image of an object in a first region and a second image of the object in a second region disposed closer to the camera than the first region; an image processing unit to detect the object in the first image and to identify the object in the second image, the image processing unit having a first image processing unit that detects and saves the first images and a second image processing unit that identifies and saves all objects in the second images; a storage device to store the second image corresponding to the identified object; and an alarming unit to activate an alarm signal depending on whether the identified object corresponds to a predetermined object.

The security system may further include a server configured to collect and analyze event information to generate the status information and transmit the status information to the user terminal, the status information may be provided in a message format suitable for a situation in which the object is detected and/or identified.

The server may be configured to classify the event information into a predetermined period, and to transmit the event information to the user terminal by summarizing the event information.

The user terminal may be configured to connect to the storage device and to select specific events of the storage device, and to store the specific events in separate categories.

The doorbell may further include a motion detector to send a first signal to the camera to capture the first image if the object is in the first region, and to send a second signal to the camera to capture the second image if the object is in the second region.

The doorbell may further include a motion detector to send a first signal to the first image processing unit to detect the object in the first image if the object is in the first region, and to send a second signal to the second image processing unit to identify the object in the second image if the object is in the second region.

The first and second image processing units may be configured to detect and/or identify objects by applying different image processing algorithms separately.

According to still another aspect of the invention, a method of operating a security system, the method includes the steps of: capturing a first image of an object in a first region; detecting the object in the first image; capturing a second image of the object in a second region closer than the first region; identifying the object from the second image; storing the second image corresponding to the identified object; and transmitting information corresponding the identified object to a user terminal.

The method may further include the step of classifying the information into a predetermined time period and transmitting the information to the user terminal by summarizing; the information from the predetermined time period.

The method may further include the step of comparing the second image including the identified object with pre-stored images, and transmitting the information corresponding to the identified object same as the pre-stored images to the user terminal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
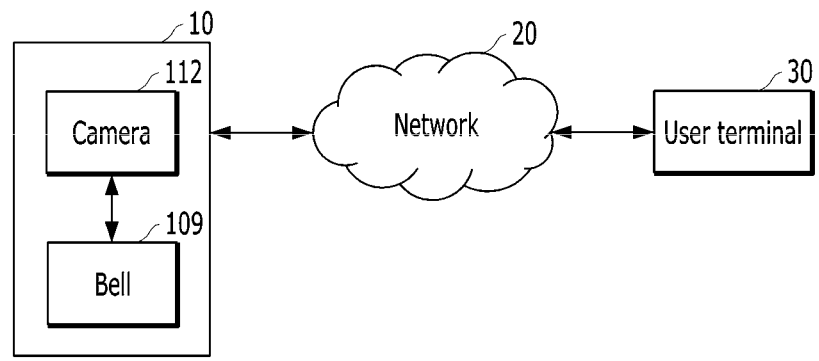
FIG. 1 is a schematic block diagram of an exemplary embodiment of a security system constructed according to the principles of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

According to one or more exemplary embodiments, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. In this manner, a server, and/or one or more components thereof may include or otherwise be associated with one or more memories (not shown) including code (e.g., instructions) configured to cause a server, and/or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CD-RW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
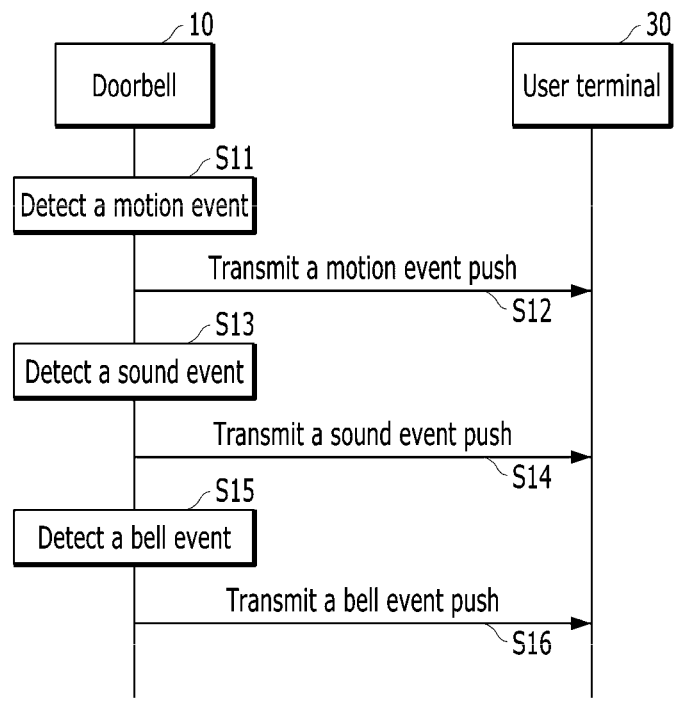
FIG. 2 is a flowchart schematically illustrating signaling in and the operation of the security system shown in FIG. 1.

FIG. 1 is a schematic block diagram of an exemplary embodiment of a security system constructed according to the principles of the invention. FIG. 2 is a flowchart schematically illustrating signaling in and the operation of the security system shown in FIG. 1.

Referring to FIG. 1, a security system constructed according to an exemplary embodiment of the invention includes a doorbell apparatus 10 and a user terminal 30. The doorbell apparatus 10 may communicate with the user terminal 30 through a network 20.

The network 20 may include a short distance wireless communication network such as Zigbee, Bluetooth, Radio Frequency Identification (RFID), NFC, infrared communication, and a mobile communication network such as 3G, 4G (LTE), WiFi, WiBro, WiMAX, and a wireless internet communication network, a Sub 1 GHz band communication, and/or a wired communication network.

In general, the doorbell apparatus may signal a video phone installed in the house to output an alarm sound when a visitor presses the bell, so that the user can confirm the identity of the visitor through use of the video phone.

The doorbell apparatus 10 according to an exemplary embodiment may communicate with the user terminal 30 in real time using the network 20 even when the user is not in the house where the doorbell apparatus 10 is installed. Accordingly, when the visitor enters the image sensing area of the doorbell apparatus 10 or presses the bell 109, it is possible to provide to store an image of the visitor and send to the user, as describer herein.

The doorbell device 10 may be interfaced with at least one registered user terminal 30 using wireless communication.

Referring to FIG. 2, the doorbell apparatus 10 can detect an image event from an image acquired by the camera 112 (S11). In an exemplary embodiment, the doorbell apparatus 10 may detect and/or identify objects by applying two or more different image processing algorithms according to different areas into which the image acquired from the camera is divided (referring to FIG. 6B). The doorbell apparatus 10 may transmit a motion event push to the user terminal 30 when a motion event is detected (S12).

The doorbell apparatus 10 can detect a sound event from the sound acquired by the microphone (S13). The doorbell apparatus 10 can detect a sound event by detecting an abnormal sound in the surroundings. When the doorbell apparatus 10 detects a sound event, it can transmit a sound event push to the user terminal 30 (S14).

The doorbell apparatus 10 may transmit at least one of the captured images, the information of the identified object OB and the alarm sound information according to the object OB to the user terminal 30 together with the event push. The alarm sound information may include alarm sound distinction data such as a title, an identifier, and an index of the alarm sound promised between the doorbell apparatus 10 and the user terminal 30.

The user terminal 30 may receive motion and/or sound event pushes, and the user can monitor the situation around the doorbell apparatus 10. In an exemplary embodiment, the user terminal 30 receives the information of the identified object, selects a corresponding alarm sound from the alarm sound information for each object stored in the user terminal 30, and outputs the corresponding sound source.

In another exemplary embodiment, the user terminal 30 may receive alarm tone information and output a sound source corresponding to the received alarm tone information. The doorbell apparatus 10 may transmit a bell event push to the user terminal 30 (S16) when a bell activation event is detected (S15). The user can select a call mode from the user terminal 30 and perform a call with the visitor in real time.

Figure 3:
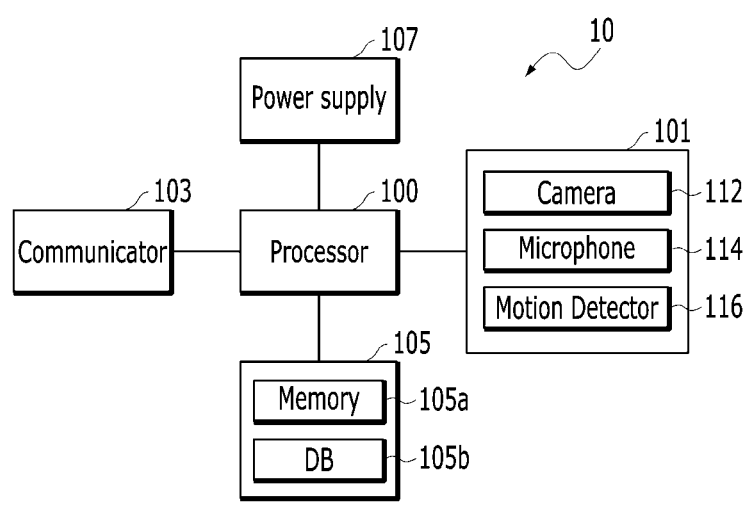
FIG. 3 is a block diagram of an exemplary embodiment of a doorbell apparatus constructed according to the principles of the invention.

FIG. 3 is a block diagram of an exemplary embodiment of a doorbell apparatus constructed according to the principle of the invention.

Referring to FIG. 3, a doorbell apparatus 10 constructed according to an exemplary embodiment of the invention may include a processor 100, a sensor unit 101, a communicator 103, a storage device 105, and a power supply 107. The sensor unit 101 may include at least one sensor built in the doorbell apparatus 10 or installed inside and/or outside the door where the doorbell apparatus 10 is installed. The at least one sensor may include a camera 112, a microphone 114 and a motion detector 116 as is known in the art.

The camera 112 may include an image sensor, a lens, and a filter, as is known in the art. The camera 112 is installed on the inside and/or outside of the door, and can capture images regarding indoor and/or outdoor situations. The camera 112 can photograph an image of a predetermined area around the doorbell apparatus 10. According to the exemplary embodiment, the camera 112 may capture an object in the first region and/or an object image in the second region disposed in a different position from the camera, than the first region.

For example, the second region may be closer to the camera 112 (i.e., the doorbell device) than the first region. The first region and the second region may be set according to the performance of the camera 112 and the external environment.

The first region may be a range of distances from the camera that detect movement of the object from the image captured by the camera 112 or detect whether the object is a person. The second region may be a range of distances from the camera 112 that is suitable to identify the object, e.g., for facial recognition of the object.

For example, the first region may be a 10-meter distance or a 5-meter distance from the camera 112 and the second region may be a 5-meter distance or a 3-meter distance from the camera 112.

The microphone 114 may be installed on the outside of the door, and may detect the sound from outside. The sensor unit 101 may further include various sensors capable of detecting an external intrusion and/or a danger or an accident, such as a gas sensor, a temperature sensor, and an illuminance sensor.

For example, the motion detector 116 may be used to detect motion of an object approaching the camera 112 and obtain distance information between the object and the camera. The motion detector 116 may include an infrared ray sensor. For example, using the infrared ray sensor, the incident position of the infrared ray reflected by the near and far objects is changed, such that the distance between the object and the camera 112 can be calculated. Accordingly, the motion detector 116 may determine whether the object exists in the first region or in the second region. The motion detector 116 may send a first signal to the camera 112 and/or the processor 100 when it is determined that the object is in the first region and send a second signal to the camera 112 and/or the processor 100 when the object is determined to be in the second region.

The communicator 103 may be a communication unit for communicating with other devices using the a short distance wireless communication network such as Zigbee, Bluetooth, Radio Frequency Identification (RFD), NFC, infrared communication, and a mobile communication network such as 3G, 4G (LTE), WiFi, WiBro, WiMAX, and a wireless internet communication network, a Sub 1 GHz band communication, and/or a wired communication network. The communicator 103 may be connected to the user terminal 30 by wire or wireless communication.

The storage device 105 may include a memory 105a and a database 105b. The memory 105a may store a program for processing and controlling the processor 100, and may store input or output data. In the database 105b, motion events of the object located in the second region may be stored by the user's selection. For example, the objects in the motion events may be classified into groups such as family, friends, and the like and stored in the database. The storage device 105 may include an external storage medium such as an internal memory and/or an SD card. The storage device 105 may include a web storage, a cloud server, or the like, which performs a storage function on the Internet.

The user terminal 30 may access the storage device 105 to search for and reproduce the stored motion and/or sound matching the event condition and time condition.

Figure 4:
FIG. 4 is a screenshot showing an example of a screen of a user terminal according to an exemplary embodiment.

FIG. 4 is a screenshot showing an example of a screen of a user terminal according to an exemplary embodiment. Referring to FIG. 4, a user may select a motion event in which a specific object is captured through a screen 300 of the terminal, and store the selected motion event in the database 105b.

That is, the user can connect to the storage device 105 through the user terminal 30 and store specific motion events of the database 105b in separate categories. Each category may be divided into a plurality of groups such as a family, a friend, etc. When the objects included in the group visit again and are captured as a second image and then recognized as the same object by comparing the stored motion events, corresponding information may be provided to the user terminal as separate events. The motion event of each stored object may include a front shape of the object as well as side shapes of the object.

The power supply 107 may convert the AC or DC power supplied from the external power supply into the power required for the operation of each component. The power source 107 may include an auxiliary power source such as a rechargeable battery.

The processor 100 may be implemented with any number of hardware and/or software configurations that perform particular functions. For example, the processor 100 may refer to a data processing device embedded in hardware, having physically structured circuitry to perform the functions represented by code or instructions contained within the program.

The processor 100 may control the overall operation of the doorbell apparatus 10 and perform functions such as exchanging control signals with these components to control the operation of each component.

Figure 5:
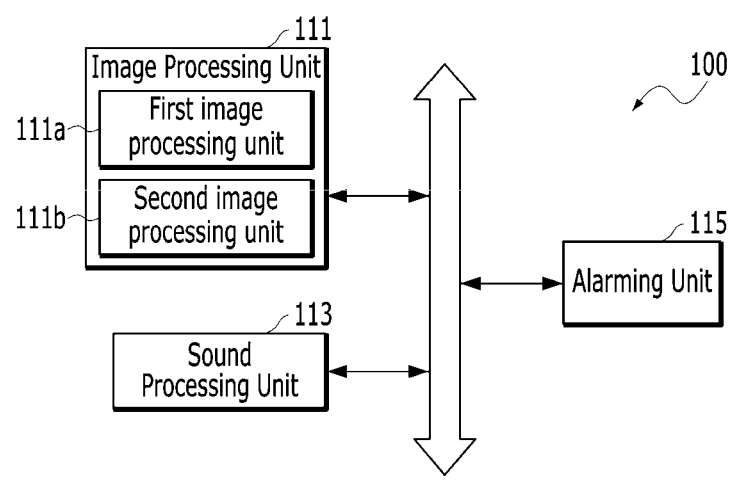
FIG. 5 is a block diagram illustrating the components of the processor shown in FIG. 3.
Figure 6A:
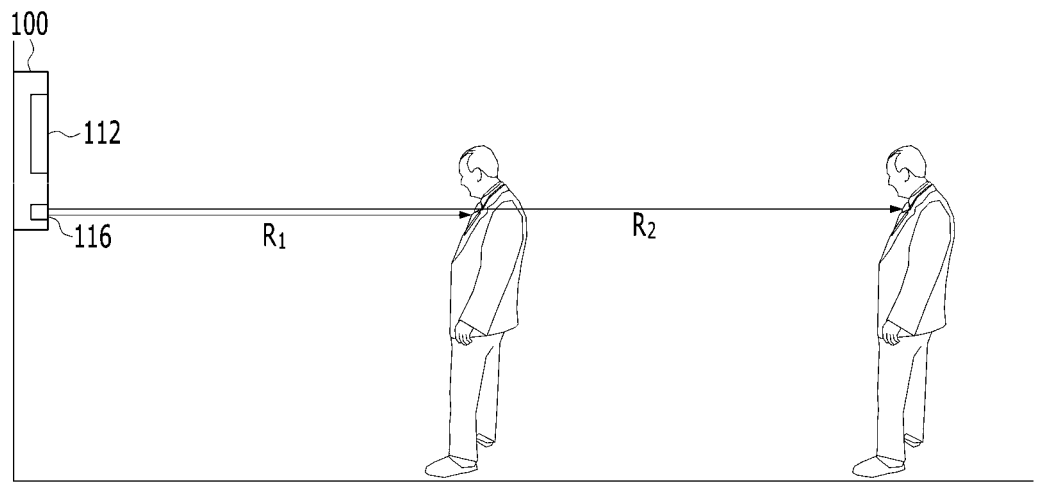
FIGS. 6A and 6B are diagrams illustrating examples of operation of the first image processing unit and the second image processing unit shown in FIG. 5.
Figure 6B:
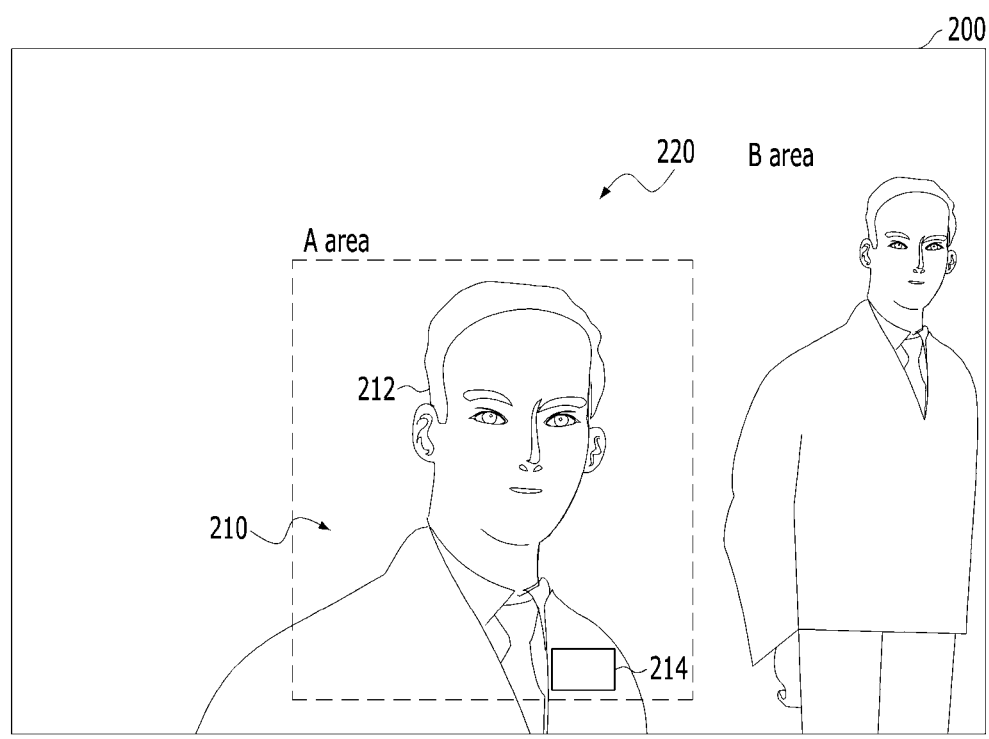

FIG. 5 is a block diagram illustrating the components of the processor shown in FIG. 3, FIGS. 6A and 6B are diagrams illustrating examples of operation of the first image processing unit and the second image processing unit shown in FIG. 5.

Referring to FIG. 5, the processor 100 may include an image processing unit 111, a sound processing unit 113, and an alarming unit 115.

The image processing unit 111 may include a video codec as is known in the art and may process images captured by the camera 112. In addition, the image processing unit 111 according to the exemplary embodiment may be divided into a first image processing unit 111a for image processing a motion event of an object obtained in the first region and a second image processing unit 111b for image processing a motion event of the object Obtained in the second region. In other words, the first image processing unit 111a may detect and save the first images and a second image processing unit 112a may identify and save all objects in the second images.

In an exemplary embodiment, the first and second image processing units 111a, 111b may separately detect and/or identify objects by applying different image processing algorithms. For example, the first image processing units 111a may apply an object detection algorithm such as motion detection (MD) algorithm and human detection (HD) algorithm as is known in the art. Also, the second image processing units 111b may apply an object identification algorithm such as face recognition (FR) algorithm as is known in the art. In other words, the first and second image processing units 111a, 111b may separately apply an object detection algorithm and an object identification algorithm to the image according to the location of the object. Accordingly, the first image processing unit 111a may apply the object detection algorithm to the first image which is the image of an object captured in the first region, and the second image processing unit 111b may apply the object identification algorithm to the second image which is the image of an object captured in the second region.

Referring to FIG. 6A, the doorbell apparatus 10 may include a camera 112 and a motion detector 116. The motion detector 116 may detect motion of an object approaching the camera 112, and obtain the distance information between the object and the camera. The motion detector 116 may include an infrared ray sensor and operates similar to a radar detector to determine the distance information.

The motion detector 116 may determine whether the object exists in the first region or in the second region. As illustrated above, using the infrared ray sensor as the motion detector 116, the incident position of the infrared ray reflected by the near and far objects is changed, such that the distance between the object and the camera 112 can be calculated. If the motion detector 116 determines that the object is in the first region, the motion detector 116 may send the first signal to the camera 112 to capture an image in the first region. In the same manner, if the motion detector 116 determines that the object is in the second region, the motion detector 116 may send the second signal to the camera 112 to capture an image in the second region.

In addition, if the motion detector 116 determines that the object is in the first region, the first signal may be sent to the processor 100 and the first image processing unit 111a may operate accordingly. Similarly, if the motion detector 116 determines that the object is in the second region, the second signal may be sent to the processor 100 and the second image processing unit 111b may operate accordingly.

The first image processing unit 111a may detect an object from a first image of which the camera 112 has captured the first region. The first image processing unit 111a may detect an object in the first region by applying an object detection algorithm to the first image.

The first image processing unit 111a may detect an object from an image using known motion detection (MD) or human detection (HD) algorithms. Since the human detection algorithm detects a human shape, it is possible to detect a reliable event in comparison with a motion detection algorithm that detects a change in the surrounding environment such as a change in illumination.

The second image processing unit 111b may identify the object from the second image in which the camera 112 has captured the second region when the detected object is in the second region. The second image processing unit 111b may identify an object in the second region by applying known face recognition (FR) algorithm to the image.

For example, the second image processing unit 111b may distinguish whether the detected object is a registered object or an unregistered object by comparing a previously registered face pattern with a face pattern of the detected object.

In another exemplary embodiment, referring to FIG. 6B, the image processing unit 111 may divide the image 200 acquired by the camera into at least two areas 210 and 220, and the object detection algorithm and the object identification algorithm can be separately applied to each of the divided areas 210 and 220. For example, the first image processing unit 111a may apply the object detection algorithm to the first area 220 of the acquired image corresponding to the first region, and the second image processing unit 111b may apply the object identification algorithm to the second area 210 of the acquired image corresponding to the second region.

In other words, an object can be detected and/or identified by applying different image processing algorithms to the areas 210 and 220 within the image 200 acquired by the camera. For example, referring to FIG. 6B, the center portion of the image 200 may be the A area 210 corresponding to the second region, and other portions may be the B area 220 corresponding to the first region.

Accordingly, as illustrated in FIG. 6B, if there is an object in the B area 220 of the acquired image, the object detection algorithm for detecting the object may be operated by the first image processing unit 111a. In the same manner, if an object exists in the A area 210, the object identification algorithm for identifying the object may be operated by the second image processing unit 111b.

In the exemplary embodiments, the object identification algorithm may identify the company ID information 214 of the object the A area 210, as well as face 212 of the object. Accordingly, if the company ID information 214 is also recognized in addition to the face 212 of the object when recognizing the object, the motion event corresponding to the object may be stored as separate group information.

In still another exemplary embodiment, the object detection algorithm of the first image processing unit 111a and the object identification algorithm of the second image processing unit 111b may operate continuously and simultaneously without a motion detector. In this case, if the object is in the first area, object detection algorithm operates normally to identify the object and the object identification algorithm also operates but does not return a valid result because the distance is too far to recognize the face of the object. However, if the object is in the second area, the object identification algorithm operates normally to return a valid result because the distance is close enough to recognize the face of the object.

In addition, the image processor 111 may store the images of the objects in the first region and the objects in the second region, respectively, in the storage device 105.

The sound processing unit 113 may include an audio codec and process sound received through the microphone 114, as is known in the art. The sound processing unit 113 may detect a sound event set by the user, for example, a collision sound, a shout, a scream, etc., from the received sound. The sound processing unit 113 may store the captured image in the storage unit 105 when a sound event is detected.

The alarming unit 115 may select an alarm sound when a motion event is detected or identified by the image processing unit 111. The alarm sound may be set for each registered object, for example, a first alarm sound corresponding to the first registered object, a second alarm sound corresponding to the second registered object.

The alarming unit 115 may select an alarm sound corresponding to the identified object. In addition, the user may set a third alarm sound corresponding to the non-registered object. In an exemplary embodiment, setting a different alarm sound for each registered object allows the user to individually recognize the visitor in advance according to the alarm sound before the visitor presses the bell, e.g., whether the visitor is a family member, a previous visitor, or a new visitor. Accordingly, follow-up required for the visitor can be performed quickly.

The alarm sound selected by the alarming unit 115 may be output to the outside through the speaker. Also, the alarming unit 115 may transmit the selected alarm sound information to the user terminal 30 via the communication unit 103. The user terminal 30 may output the sound source of the alarm sound to the user based on the alarm sound information.

The alarming unit 115 may transmit at least one of motion event information (corresponding image, identified object or visitor information) and alarm tone information to the user terminal 30 when the motion event is detected. The alarming unit 115 may transmit at least one of the sound event information (corresponding image and sound) and the alarm sound information to the user terminal 30 when the sound event is detected.

Figure 7:
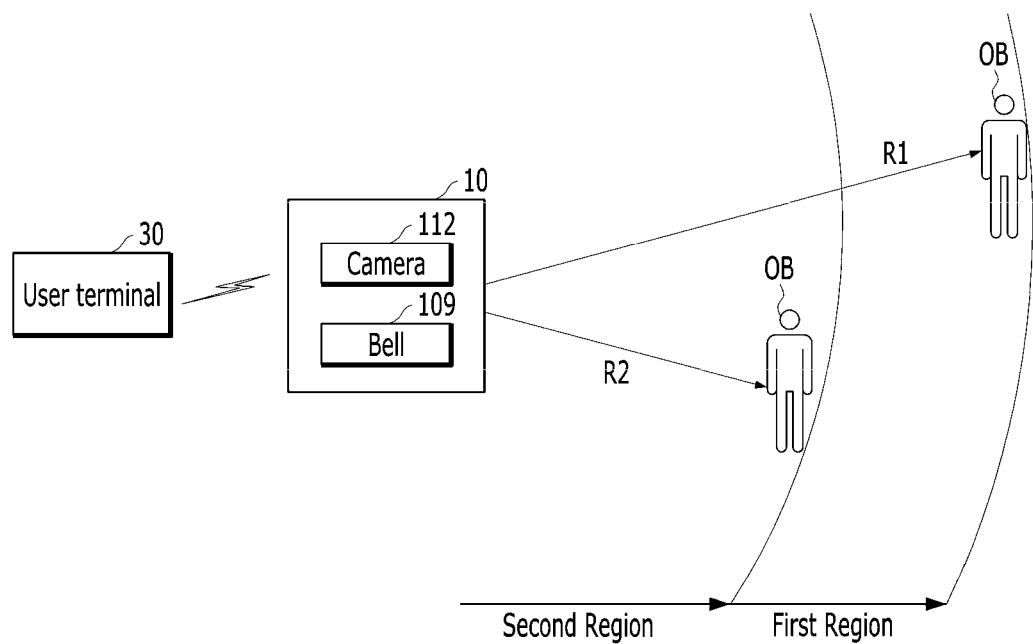
FIG. 7 is a diagram illustrating an example of image event detection according to an exemplary embodiment.

FIG. 7 is a diagram illustrating an example of image event detection according to an exemplary embodiment.

Referring to FIGS. 5 to 7, the camera 112 of the doorbell apparatus 10 may acquire the first image of the object OB which enters the first region within the first distance R1 at the first time t1.

When the first image processing unit 111a detects the object OB from the first image using the object detection algorithm, the alarming unit 115 may transmit the first motion event push to the user terminal 30 through the communication unit 103. The alarming unit 115 may transmit the first image to the user terminal 30 together with the first motion event push.

The camera 112 of the doorbell apparatus 10 can acquire the second image of the object OB when it enters the second region of the second distance R2, which is less than R1, at the second time t2.

When the second image processing unit 111b identifies the object OB from the second image using the object identification algorithm, the alarming unit 115 may transmit the second motion event push to the user terminal 30 through the communication unit 103. The alarming unit 115 may transmit the second image to the user terminal 30 together with the second motion event push.

The alarming unit 115 may transmit at least one of the identified object OB information and the alarm sound information set therein to the user terminal 30 together with the second image. The identified object OB information may be an image or text.

The user terminal 30 may select and output the alarm sound based on the identified object OB information and/or alarm sound information. For example, the alarming unit 115 may transmit information to the user terminal 30 indicating that the identified object OB is the first registered object.

The user terminal 30 may select and output the alarm sound set in the first registered object from the stored alarm sound relationship per registered object.

In another exemplary embodiment, the user terminal 30 may store a plurality of alarm sounds, and may select and output an alarm sound corresponding to the alarm sound information received from the doorbell apparatus 10. For example, the alarming unit 115 may transmit to the user terminal 30 information indicating that the identified object OB is the first registered object and information indicating the first alarm sound.

In an exemplary embodiment, the doorbell apparatus 10 may transmit visitor information to a remote user terminal 30 before the visitor presses the bell 109 of the doorbell apparatus 10. In this case, the user terminal 30 may output the first alarm sound stored in advance. Accordingly, the user may be able to secure reliable event information and detailed information of the visitor since reducing the alarming errors. Also, the user can take follow-up actions against unwanted visitors or intruders, and the user can take necessary measures for the scheduled visitor.

The doorbell apparatus 10 may transmit a bell event push to the user terminal 30 through the communication unit 103 when the visitor presses the bell 109 of the doorbell apparatus 10. The user may select a video mode or a voice mode at the user terminal 30. In the video mode, the user can perform real-time video communication with the visitor. In the voice mode, the user can perform a real time voice call with the visitor.

In another exemplary embodiment, the camera 112 of the doorbell apparatus 10 may acquire the third image of the both objects OB1 and OB2. The one object OB1 is the object which enters the first region of the first distance R1 at the third time t3 and the other OB2 is the object which enters the second region of the second distance R2 at the third time t3 simultaneously.

The first image processing unit 111a may detect the object OB1 entering the first region by applying the object detection algorithm to the third image and the second image processing unit 111b may identify the object OB2 entering the second region by applying the object identification algorithm. Accordingly, the image processing unit 111 may store a partial image of the object OB that enters the first region and a partial image of the object OB that enters the second region. The alarming unit 115 may transmit the partial image of the object OB1 that enters the first region and the partial image of the object OB2 that enters the second region to the user terminal 30.

Figure 8:
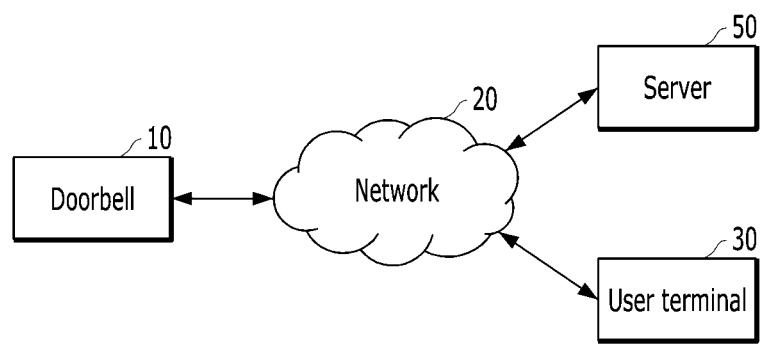
FIG. 8 is a schematic block diagram of another exemplary embodiment of a security system constructed according to the principles of the invention.
Figure 9:
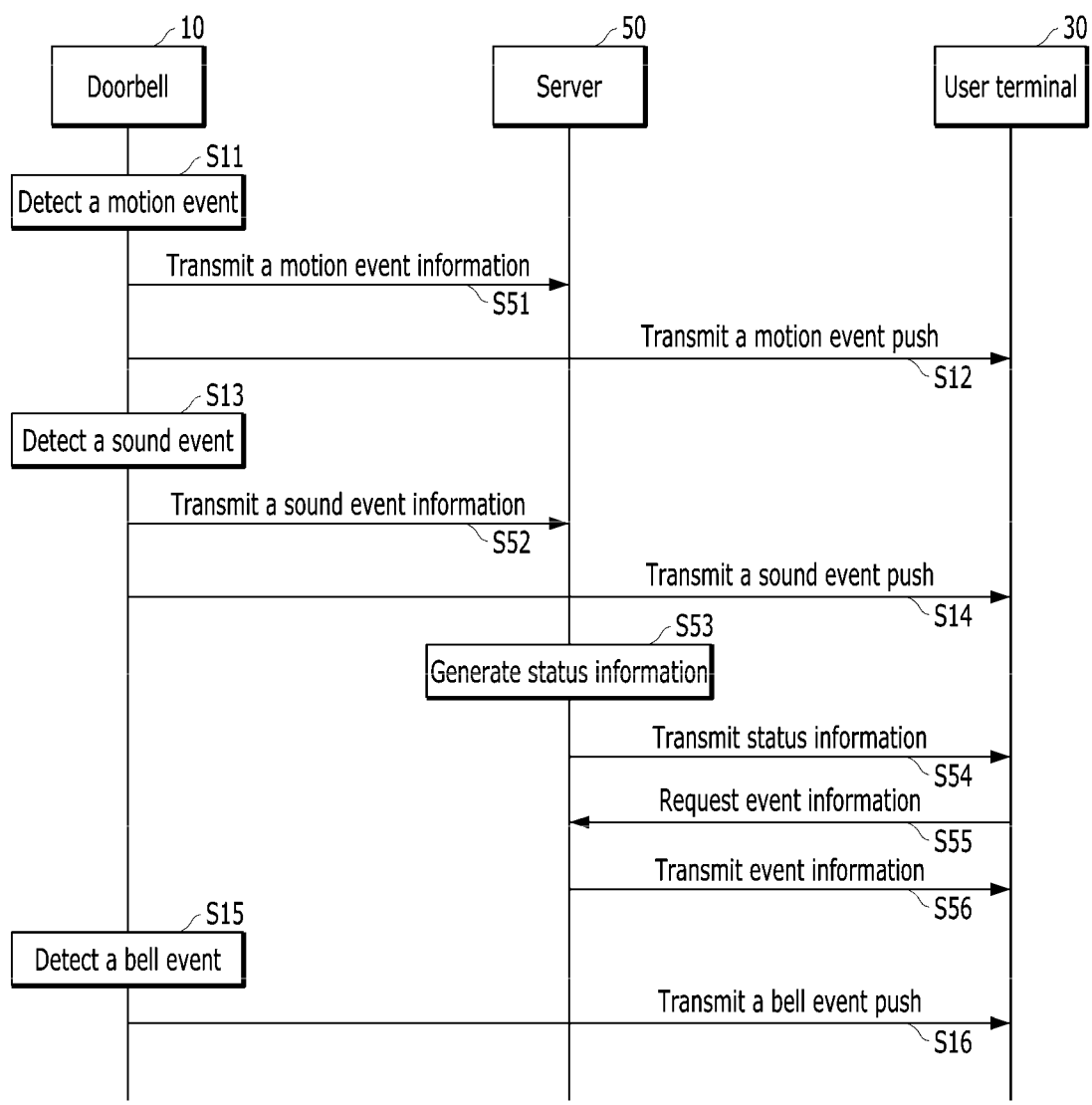
FIG. 9 is a flowchart schematically illustrating signaling in and the operation of the security system shown in FIG. 8.

FIG. 8 is a schematic block diagram of another exemplary embodiment of a security system constructed according to the principles of the invention. FIG. 9 is a flowchart schematically illustrating signaling in and the operation of the security system shown in FIG. 8.

Referring to FIGS. 8 and 9, the doorbell apparatus 10 may communicate with the user terminal 30 and/or the server 50 via a network 20.

The embodiment of FIG. 8 differs from the embodiment of FIG. 1 in that a server 50 is added. Hereinafter, differences will be mainly described, and detailed description of overlapping contents of the same configuration will be omitted to avoid redundancy.

The server 50 may store same information which stored in the storage device 105 of the doorbell apparatus 10. Also, the server 50 may include an artificial intelligence (AI) device (not shown) such as commercially available devices like Alexa sold by AMAZON, and the user terminal may receive event information from the artificial intelligence device.

The doorbell apparatus 10 may detect a motion event from the image acquired by the camera (S11). The doorbell apparatus 10 may detect a first motion event for detecting an object in a first region and a second motion event for identifying an object in a second region, respectively.

The doorbell apparatus 10 may detect a sound event from the sound acquired by the microphone (S13).

The doorbell apparatus 10 may transmit an event push to the user terminal 30 when an event is detected (S12, S14). The doorbell apparatus 10 may transmit the alarm sound information corresponding to the corresponding image to the user terminal 30 together with the event push.

The user terminal 30 may receive the event push and the user can recognize the situation around the doorbell apparatus 10. When a bell push event is detected (S15), the doorbell apparatus 10 may transmit a bell event push to the user terminal 30 (S16).

The user may select a video mode and/or a sound mode from the user terminal 30, and perform a video call and/or a voice call with the visitor in real time. The doorbell apparatus 10 may transmit motion event information to the server 50 when the motion event is detected (S51).

The motion event information may include an event image and an event occurrence time. When the doorbell apparatus 10 detects a sound event, the doorbell apparatus 10 may transmit the sound event information to the server 50 (S52). The sound event information may include an event detected as an event, an image captured at the time of the sound event is detected, and an event occurrence time.

The server 50 may collect and analyze the event information to generate the status information (S53). The server 50 may transmit the status information to the user terminal 30 (S54). The status information may be provided in a message format (text) suitable for a situation in which the object is detected and/or identified and may be composed of words, phrases, sentences, and the like. The user terminal 30 may request event information corresponding to the status information received by the server 50 (S55).

The server 50 may provide the event information to the user terminal 30 in response to the event information request from the user terminal 30 (S56).

The server 50 may classify the event information into a predetermined period, and transmit the event information to the user terminal 30 by summarizing the event information on a day-by-day or on every week.

Figure 10:
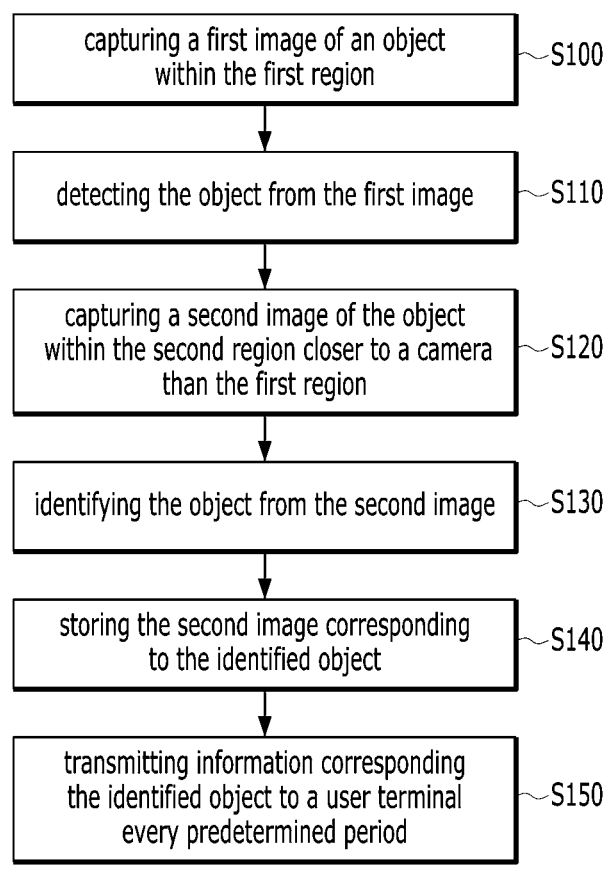
FIGS. 10 and 11 are flowcharts illustrating operations of a security system according to other exemplary embodiments.
Figure 11:
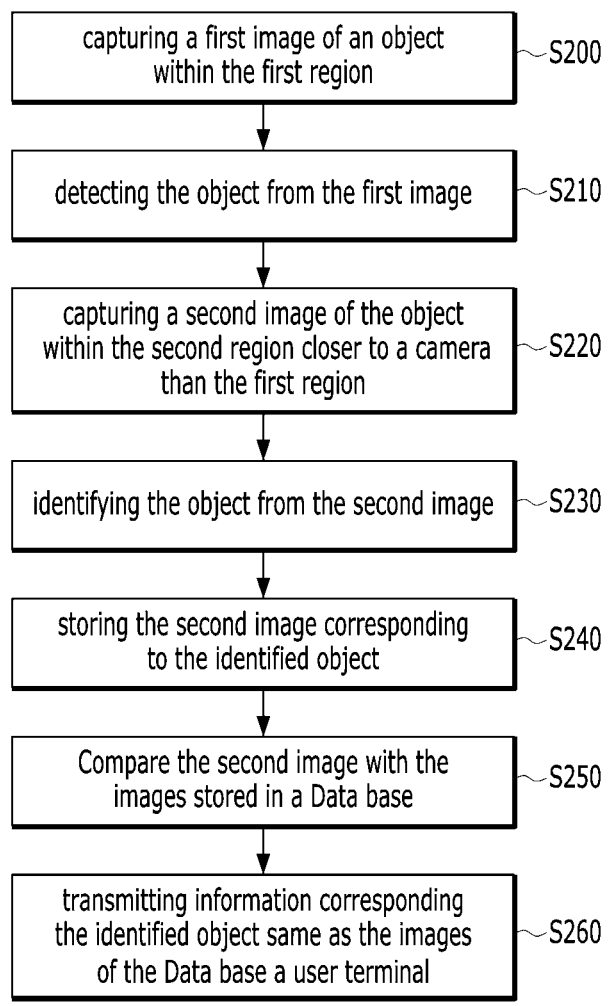

FIGS. 10 and 11 are flowcharts illustrating operations of a security system according to other exemplary embodiments.

Referring to FIGS. 3, 6, and 10, the camera 112 of the doorbell apparatus 10 may capture a first image of the object OB in a first region (S100). In addition, the motion detector 116 may determine whether the object OB is in the first region or in the second region. The motion detector 116 may transmit the first signal to the processor 100 when it determines that the object OB is in the first region.

When the processor 100 received the first signal, the first image processing unit 111a may process the first image by applying the object detection algorithm, and detect the object OB in the first image (S110).

Then, the camera 112 may capture a second image for the object OB in the second region (S120). The motion detector 116 may transmit a second signal to the processor 100 when it determines that the object OB is in the second region.

When the processor 100 received the second signal, the second image processing unit 111b may process the second image by applying the object identification algorithm, and identify the object OB in the second image (S130).

Then, the event information corresponding to the second image and the second image including the identified object may be stored in the storage device 105 and/or server 50 (S140).

Then, the server 50 may classify the event information into a predetermined time period, and transmit the event information to the user terminal 30 by summarizing the event information on a day-by-day or weekly basis. (S150)

As another exemplary example, referring to FIGS. 3, 4, 6, and 11, the camera 112 of the doorbell apparatus 10 may capture a first image of the object OB in a first region (S200). In addition, the motion detector 116 may determine whether the object OB is in the first region or in the second region. The motion detector 116 may transmit the first signal to the processor 100 when it determines that the object OB is in the first region.

When the processor 100 received the first signal, the first image processing unit 111*a* may process the first image by applying the object detection algorithm, and detect the object OB in the first image (S210).

Then, the camera 112 may capture a second image for the object OB in the second region (S220). The motion detector 116 may transmit a second signal to the processor 100 when it determines that the object OB is in the second region.

When the processor 100 received the second signal, the second image processing unit 111*b* may process the second image by applying the object identification algorithm, and identify the object OB in the second image (S230).

Then, the event information corresponding to the second image and the second image including the identified object may be stored in the storage device 105 and/or server 50 (S240).

As described above with reference to FIG. 4, the user can select motion events in which a specific object is captured through the screen 300 of the user terminal 30, and store the selected motion events in the database 105*b* and/or the server 50. That is, the user terminal 30 may connect to the storage unit 105 in the doorbell 10 and/or the server 50 through and store specific motion events classified into different categories in the database 105*b*.

Accordingly, the server 50 may compare the second image including the identified object with the images stored in the database (S250), and if the identified object matches the image stored in the database, the information corresponding to the identified object same as the images stored in the database to the user terminal 30 (S260).

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A security system comprising:
a doorbell to detect an object in a first region, and to identify the object in a second region, the doorbell comprising:
  a camera to acquire a first image of an object entering the first region at a first distance from the camera at a first time and a second image of the object entering the second region at a second distance from the camera at a second time, the second region being disposed closer to the camera than the first region such that the object is closer to the camera at the second time than at the first time;
  an image processor having a first image processor to detect without identifying the object in the first image by applying an object detection algorithm and a second image processor to identify the same object in the second image that was detected in the first image by applying an object identification algorithm different from the object detection algorithm;
  a storage device to store the second image corresponding to the identified object; and
  an alarm to activate an alarm signal depending on whether the identified object corresponds to a predetermined object;
a user terminal to receive information corresponding the identified object from the doorbell; and
a communication network to provide one or more communication channels between the user terminal and the doorbell.

2. The system of claim 1, further comprising:
a server configured to collect and analyze an event information to generate the status information and transmit the status information to the user terminal, the status information being provided in a message format suitable for a situation in which the object is detected and/or identified.

3. The system of claim 2, wherein the server is configured to classify the event information into a predetermined period, and to transmit the event information to the user terminal by summarizing the event information.

4. The system of claim 1, wherein the user terminal is configured to connect to the storage device and to select specific events of the storage device, and to store the specific events in separate categories.

5. The system of claim 1, wherein the doorbell further comprises a motion detector to send a first signal to the camera to capture the first image if the object is in the first region, and to send a second signal to the camera to capture the second image if the object is in the second region.

6. The system of claim 1, wherein the doorbell further comprises a motion detector to send a first signal to the first image processor to detect the object in the first image if the object is in the first region; and to send a second signal to the second image processor to identify the object in the second image if the object is in the second region.

7. An apparatus comprising:
a camera to acquire a first image of an object entering a first region at a first distance from the camera at a first time and a second image of the object entering a second region at a second distance from the camera at a second time, the second region being disposed closer to the camera than the first region such that the object is closer to the camera at the second time than at the first time;
an image processor having a first image processor to detect without identifying the object in the first image by applying an object detection algorithm and a second image processor to identify the same object in the second image that was detected in the first image by applying an object identification algorithm different from the object detection algorithm;
a storage device to store the second image corresponding to the identified object; and
an alarm to activate an alarm signal depending on whether the identified object corresponds to a predetermined object.

8. The apparatus of claim 7, further comprising:
a motion detector to determine whether an object is in the first region or the second region.

9. The apparatus of claim 8, wherein the motion detector sends a first signal to the camera to capture the first image if the object is in the first region, and the motion detector sends a second signal to the camera to capture the second image if the object is in the second region.

10. The apparatus of claim 8, wherein the motion detector sends a first signal to the first image processor to detect the object in the first image if the object is in the first region, and the motion detector sends a second signal to the second image processor to identify the object in the second image if the object is in the second region.

11. The apparatus of claim 7, wherein the image processor is configured to identify all objects in the second images.

12. The apparatus of claim 7, wherein the first and second image processors separately detect and/or identify objects by applying different image processing algorithms.

13. The apparatus of claim 7, wherein the image processor is configured to divide the image acquired by the camera into first and second areas, and applies different algorithm to image data in the first and second areas.

14. The apparatus of claim 13, wherein the first image processor applies an object detection algorithm to the first area corresponding to the first region, and the second image processor applies an object identification algorithm to the second area corresponding to the second region.

15. The apparatus of claim 14, wherein the second area is a center portion of the image acquired by the camera.

16. The apparatus of claim 7, further comprising:
a microphone installed on the outside of the door,
a sound processing unit to detect a sound event received from the microphone and to store the image captured by the camera in the storage device when the sound event is detected.

17. A method of operating a security system, the method comprising the steps of:

capturing a first image of an object entering a first region at a first distance from a camera at a first time;
detecting without identifying the object in the first image by applying an object detection algorithm;
capturing a second image of the object entering a second region at a second distance from the camera at a second time, the second region being disposed closer to the camera than the first region such that the object is closer to the camera at the second time than at the first time;
identifying the same object from the second image that was detected in the first image by applying an object identification algorithm different from the object detection algorithm;
storing the second image corresponding to the identified object; and
transmitting information corresponding the identified object to a user terminal.

18. The method of claim 17, further comprising the step of classifying the information into a predetermined time period and transmitting the information to the user terminal by summarizing the information from the predetermined time period.

19. The method of claim 17, further comprising the steps of:
comparing the second image including the identified object with pre-stored images, and transmitting the information corresponding to the identified object same as the pre-stored images to the user terminal.

* * * * *